O. H. DE LAPOTTERIE.
COMPOUND METAL BODY.
APPLICATION FILED MAR. 22, 1915.
1,180,249. Patented Apr. 18, 1916.
2 SHEETS—SHEET 1.
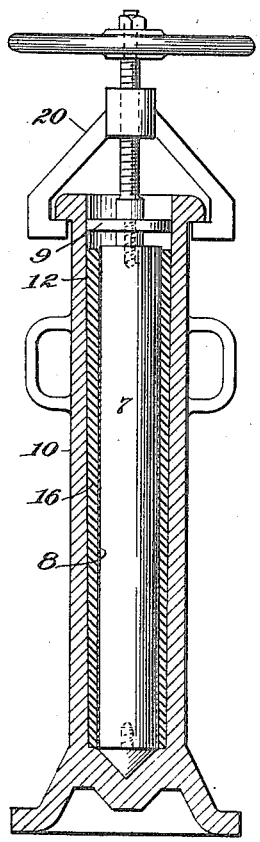
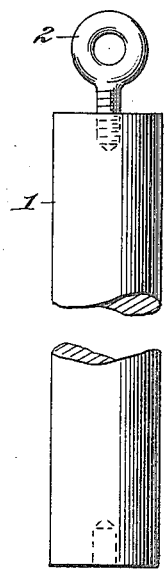
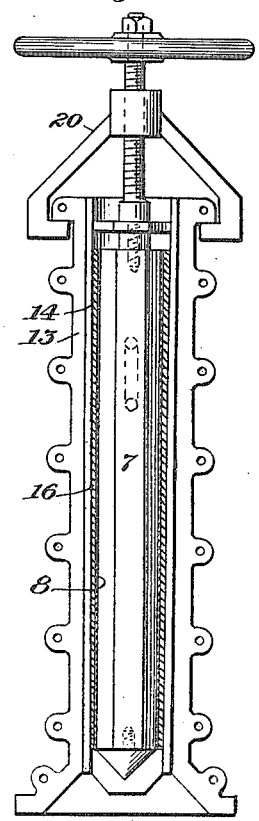
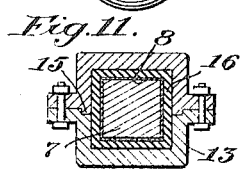
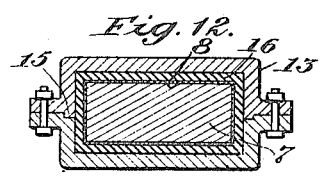
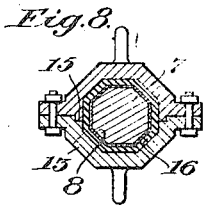
Inventor:
Otto H de Lapotterie
by Byrnes Munsell Brickenstein
Attys.

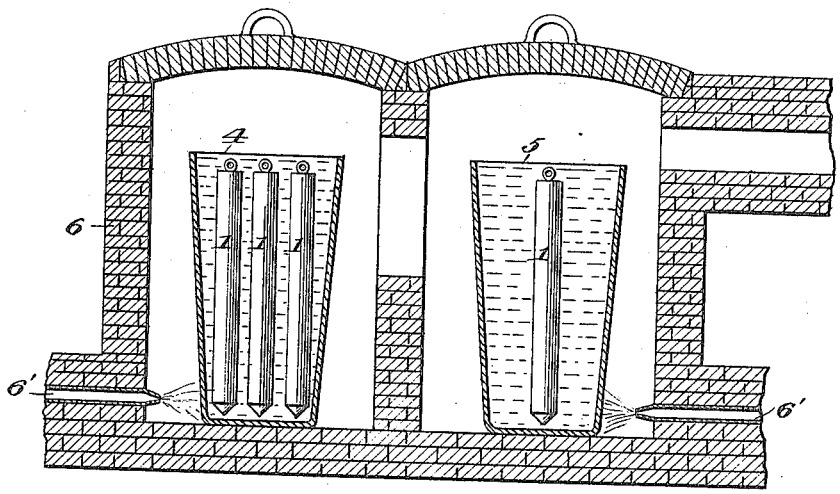
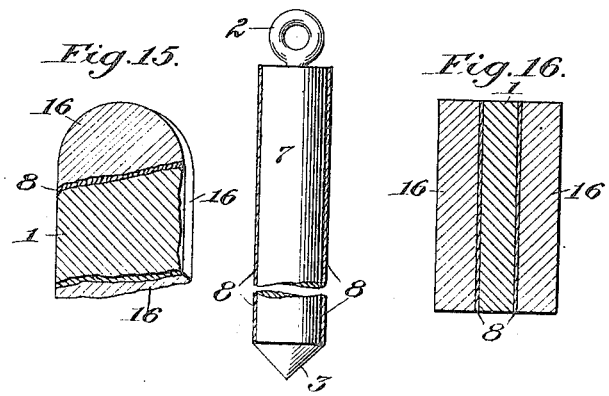

UNITED STATES PATENT OFFICE.

OTTO H. DE LAPOTTERIE, OF NEW BRIGHTON, PENNSYLVANIA.

COMPOUND METAL BODY.

1,180,249.

Specification of Letters Patent.

Patented Apr. 18, 1916.

Original application filed April 7, 1914, Serial No. 830,198. Divided and this application filed March 22, 1915. Serial No. 16,189.

*To all whom it may concern:*

Be it known that I, OTTO H. DE LAPOTTERIE, a citizen of the United States, residing at New Brighton, in the county of Beaver and State of Pennsylvania, have invented certain new and useful Improvements in Compound Metal Bodies, of which the following is a specification.

This invention relates to compound metal bodies consisting of united layers or strata of unlike metals, i. e. metals or alloys of unlike chemical nature, so firmly and permanently united that they will resist the action of cleaving tools, violent temperature changes, and distortion, to separate them.

This application is a division of my application Serial No. 830,198, filed April 7, 1914.

Because the nature of a union between metals which are unlike in the above sense, produced according to the method herein described, would be considered by those skilled in the art as an alloyed one, and also because I lack a more suitable term, I shall refer to a union so secured as an alloyed one, alloy united, or plain alloy union, without intending thereby to limit or confine myself to any particular theory as to the actual nature of the union between the unlike metals, merely using the said terms as distinguishing and convenient ones.

By the method hereinafter described it is possible to produce compound metal ingots, and also manufactured articles, of compound metal, such as plates, sheets, rods, tube, wire, and the like, and the same may be either the product of the compound metal ingot extended by drawing, rolling, pressing, hammering, etc., or made by coating finished metal articles, without departing from the spirit of my invention.

It is well known that it is very difficult to unite, permanently, unlike metals, such as wrought iron and the various steels, with metals of unlike nature such as copper, silver, gold, aluminum, cupriferous alloys (such as bronze, brass, etc.), aluminum alloys (such as aluminum bronze, manganese bronze, etc.) It is also generally considered that metals of high melting-point cannot be cast at their ordinary casting temperatures against a metal surface coated with a metal of low melting temperature such as tin, without causing detrimental oxidation, volatilization, or vaporization of the metal of low melting temperature,—due to the fact that the temperature necessary to bring the metals of high melting temperature to a casting condition is sufficient to oxidize, volatilize, or vaporize the metal of low melting temperature, and prevent a perfect union being formed. It has further heretofore been found necessary in the art of coating metals with metals of high melting-point to protect a film coating secured from such metals or alloys from contact with the air, by neutral gases, vaporized atmospheres, chemical substances of a solvent or protecting nature, etc., because the temperatures heretofore necessary to secure such film coatings were sufficiently high to cause oxidation or other detrimental action.

It is one of the objects of my invention to eliminate these necessities.

The fundamental discovery upon which my new process rests is that while unlike metals and alloys of high melting temperatures, such as above named, do not unite readily under the usual conditions of melting, and volatilize metals of low melting temperature if cast thereagainst at the ordinary casting temperature of such high melting metals; yet, if certain deoxidized and deoxidizing alloys of such high melting metals as above referred to are maintained at a temperature considerably below that at which they are usually cast, and the metals to be coated are previously coated with a metal or alloy of low melting temperature, detrimental oxidation, volatilization, and vaporization are avoided, and the use of protecting apparatuses and added protecting manufactured influences for the film coatings obtained are eliminated. The union secured is absolutely permanent, being inseparable by change of temperature such as heating to red heat and plunging into ice water; by cleaving tools, such as a cold chisel or like tool applied along the line of demarcation (the tool tending to dig into one metal or the other) ; and by distortion in any manner to separate the joined metals; and the metals so joined permit extension to any degree by drawing, rolling, pressing, hammering, etc., without the slightest exfoliation.

Deoxidized and deoxidizing alloys, by which I mean such alloys as aluminum bronze, at a temperature, which may be called the "semi-molten" temperature, display extraordinary chemical or physical activity, readily uniting with such metals dissimilar thereto as iron and steel, if the latter are previously coated with a metal or alloy of low melting temperature, such as tin. Nor do they cause, or are they themselves, when in this semi-molten condition, subject to the detrimental influences which prevent a union between the dissimilar metals at the ordinary casting temperatures of such alloys or dissimilar metals. While the fact is as stated I am unable to give an explanation of the phenomenon. Possibly it is due to a catalytic condition existing at this temperature, or to some eutectic molecular charge accompanied by changes in physical properties. This peculiar increase of chemical activity of semi-molten deoxidized and deoxidizing alloys and the concomitant heightening of their affinity for certain other metals, whether these characteristics be molecular, atomic, catalytic eutectic, or physico-chemical, if heretofore observed has not to my knowledge been applied to the uniting of unlike metals of the classes herein contemplated, and I am not aware that any attempt has ever been made to produce between contacting surfaces of metals to be joined a coating of deoxidizing metal at a temperature so low that detrimental oxidation of the film coating secured has been avoided and the use of added manufactured deoxidizing influences therefore eliminated.

As an illustration of a deoxidized and deoxidizing metal or alloy to be used as a coating and uniting film, a ten per cent. aluminum bronze may be taken. This alloy has a casting temperature of about 1800° F. As practised in this invention, the semi-molten condition exists at a temperature considerably below 1800° F.

In coating metal with molten metal by my process, the entire coating need not necessarily be of the deoxidized metal used as a linking nexus for other metals, so long as the main coating desired has affinity for and will combine readily with the film coating. For example, when coating a ferrous metal like steel, with copper, I first film-coat the steel with tin, next with a deoxidized alloy such as aluminum bronze at semi-molten temperature, and then cast against or contact with such alloyed film-coated surface a metal such as copper at a convenient casting temperature of the copper. The molten copper, being of metal like unto the film coating, and of higher temperature, combines readily with the deoxidized and deoxidizing film coating, due to the powerful affinity, purifying, and reducing action created along the surface of union by the deoxidized metal previously applied. The scavenging and deoxidizing influences, which, in the first instance, caused the removal of impurities, dissolved oxids, and occluded gases from the film coating, now prevent the added molten copper taking them up again along the line of union between the copper and steel, securing a positive union, free from flaws, pores, impurities or other defects. Nor will re-heating of the joined bodies of unlike metals in further working deteriorate in any manner the union along the surface of contact between the joined metals. In fact, I have found that the metal along the plane of joinder is actually improved thereby. When the process is properly carried out the alloying of the film coating along the line of joinder of the copper and steel is confined to an excessively thin film between approximate surfaces, the main portion of the metals possessing their ordinary properties.

It is not essential in securing the film coating that the article to be coated shall be confined for a long period of time in the bath of semi-molten deoxidized metal, and I have found that the thickness of coating secured (to a certain degree) is in direct proportion to the length of time that the articles are immersed in the semi-molten metal. In practice when I desire to use a film coating as a linking nexus between other metals, I usually use a coating of the thickness secured by slowly lowering and raising the article to be coated in and out of a bath of the semi-molten metal, and do not leave it stationary in the bath any great length of time. Yet if a clean piece of tin-coated steel, previously heated to a temperature below the volatilizing or oxidizing temperature of the tin on such steel, is passed rapidly in and out or through a bath of semi-molten deoxidized metal such as aluminum bronze, it will be found to be coated with a firm thin permanent cohering film of the deoxidized alloy, so thin, bright, smooth, and free from flaws, pores, etc., as to be scarcely perceptible to the eye. The coating so secured, if subjected to a strong oxidizing influence for a long period of time will be found to develop the rich color of the deoxidized alloy used. In many cases this exceptionally thin film coating is sufficient to secure a union between other unlike metals, but I find that the chemical activities and affinities of the film coating are more pronounced for other metals if a film coating a little richer in deoxidized alloys is secured.

A film coating secured in the manner above described does not lose its brightness by atmospheric contamination as is common in the art of working metals of high melting temperature and it can be handled with perfect freedom in an oxidizing atmosphere such as air without fear of contamination of the film-coating in any manner. This has never been possible heretofore in the art of working metals of the class herein contemplated.

By my process, I am enabled for the first time in the history of the art, I believe, to secure a union between unlike metals of high melting temperature at a temperature so low that oxidation or contamination of the film-coating secured is avoided, and the use of added manufactured protecting apparatuses and influences necessary in other processes (such as casings of neutral gases, vaporized atmospheres, chemical fluxes, and other solvents of occluded gases and impurities) are eliminated. This is an important feature in my invention, as it permits perfect freedom of inspection of the film-coating, and assures a high percentage of perfect finished products. It also permits rehandling of the coated articles at various stages of the process and counteracts negligence on the part of the workmen employed.

In practice, to determine when the "semi-molten" or operating condition has been reached, thin pieces of tin-coated steel wire may be kept handy and dipped into the metal from time to time and the coating secured examined in the open air. It is also easy by the latter method of testing to determine when the limit of the "semi-molten" or operating temperature is exceeded, as the testing wire will then leave the bath uncoated and blackened to an excessive degree, and in this case, all that is necessary is to reduce the heating and permit the molten metal to return to a "semi-molten" condition. I have found however that aluminum bronze has a considerable range of plasticity between its plastic and liquid condition and with a fair amount of attention on the part of the operator little trouble is experienced.

In the accompanying drawings, Figure 1 shows a cylindrical ingot in elevation, and an attached screw-eye for handling; Fig. 2 is a removable center to be inserted in the bottom of the ingot; Fig. 3 is an end view of the ingot in Fig. 1; Fig. 4 shows the ingot centered in a mold; Figs. 5 and 6 are top and side views of a top centering spider; Figs. 7 and 8 are longitudinal and transverse views of a sectional mold showing an octagonal-shaped ingot; Figs. 9 and 10 are views of its top centering spider; Fig. 11 is a transverse view of a sectional mold for coating square ingots; Fig. 12 is a similar view for coating rectangular ingots; Fig. 13 shows a two-compartment furnace in which the ingots receive preliminary metallic coatings; Fig. 14 shows a film-coated ingot; Fig. 15 shows a piece of coated steel separated close to the union; and Fig. 16 shows a section of a compound ingot.

In illustrating my process, I will use as an example the uniting of copper and steel, and will assume that steel ingots are to be coated on all sides with a substantial coating of copper and then extended by manufacture into sheets, rods, and other varieties by the usual methods of metal working such as rolling, hammering, pressing, drawing, etc. For convenience in handling the ingots have attached to them the rings 2 and bottom centers 3.

A suitable number of steel ingots are first thoroughly cleaned by sand blasting or other mechanical means, and are then pickled in hydrochloric or other non-oxygenating acid in any practical manner. After pickling they are immersed in a solution of commercial sal-ammoniac i. e. one pound of sal-ammoniac to about one quart of water which is kept warm by a suitable heating source, such as a jet of steam. The ingots when warm are taken from the bath and put into a hot drying chamber maintained at about 300° F. and left until the moisture has been evaporated from their surfaces. The ingot with its surface heated to about 300° F. from the heat absorbed from the bath and drying-room is now taken to a second bath 4 which contains a low-melting metal or alloy, such as molten tin, at a temperature of fluidity commonly practised in tinning (see Fig. 13). A quantity of commercial sal-ammoniac is thrown upon the surface of the molten tin as the ingot is slowly lowered into the bath. After a short period of time depending upon the size of the ingot, the heat of the tin, and the heat absorbed in the previous operations, the ingot is raised a few inches out of the bath to see if the tin which has a strong affinity for steel under the conditions named, is cohering thereto in a very thin film and when this is observed to be the result, the ingot is drawn out of the bath through mechanical wipers in order to remove excess metal. It is next carefully inspected for flaws and if any are found this last operation is repeated. After the tin-coated steel ingot has passed inspection, and with its surface now heated to about 400° F. from contact with the molten tin, it is taken to another bath 5, containing a pure grade of commercial copper to which three to five per cent. (by weight) of commercially pure aluminum has been previously added. A higher or lower per cent. of aluminum may be used as I do not confine myself to the specific proportions herein. This bath of aluminum bronze is maintained, in the furnace 6 heated preferably by a gas or oil-burner 6', in a "semi-molten" condition. The exact limits of temperature of this semi-molten condition have not been determined, but by use of the test pieces, as above referred to, the operator will readily ascertain when the proper condition has been reached. I prefer to use this bath when it is in a state of medium plasticity, which is obtained by first melting the alloy and then permitting it to cool to the requisite degree. When the test pieces show that the "semi-molten" condition has been reached, the heat is again applied and regulated to maintain the bath in this condition. I have worked with this bath up to a point where plasticity disappears, but I find that the tin-coated steel seems to slip through the deoxidized metal more freely at a lower temperature. The tin-coated ingot is now slowly lowered and raised in and out of this bath 5 of semi-molten deoxidized alloy without leaving it stationary therein any longer than necessary. On withdrawing the now alloy-coated ingot 7 it will have been coated with a thin, firm, permanent, cohering film coating 8, shown greatly exaggerated, of the metals used, see Fig. 14, and this coating will be so thin, smooth, bright, and free from flaws as to be barely perceptible at first glance. No protection from the action of the air need be provided as the film-coating has been secured at a temperature so low that it is not oxidized and is not subject to the detrimental influences which make protection necessary in other processes. The bright alloy-coated ingot, with its surface now more highly heated from contact with the semi-molten bath of deoxidized alloy, is again inspected with perfect freedom, and if satisfactory is centered in a cover 9 of an ingot mold 10 used in the next operation. It is then taken to this mold (Fig. 4) which contains molten copper of extreme purity at its ordinary casting temperature and centered therein; or if desired, the copper 16 may be cast into the mold 10, through ports 11, provided in the cover 9 for that purpose, after the ingot has been centered in the mold 10.

The mold used is usually coated with a wash made from plumbago and water dried by heating, and the molten copper therein I usually cover with charcoal and "pole" as is well known in the art. The deoxidized film-coated ingot 7 is now centered in the molten copper in the mold by the cover 9 (in which it is centered) fitting true on the mold, and secured by the pressure-clamp 20, which prevents the ingot floating in the molten copper. The copper 16 in the mold being of like metal unto the film-coating 8 on the steel ingot readily combines therewith to form a perfect union, due to the powerful affinity, purifying and reducing action created along the line of joinder by the deoxidizing metal 5 previously applied to the copper of the film-coating; and the scavenging and deoxidizing influences which in the first instance removed from the copper of the film-coating the impurities, oxids, dissolved oxids, and occluded gases, now have the same effect on the added molten copper 16, along the surface of union between the copper and steel.

As soon as the molten copper 16 has solidified to the extent that it will permit handling, pressure-clamp 20 is removed, the eyelet 2 is reinserted, and the finished ingot is removed from the mold and subjected to a soaking heat and worked into extended ware by the usual methods of manufacture such as rolling, drawing, pressing, hammering, spinning, etc., or if desired the compound ingot of copper and steel may be permitted to cool entirely, and be reheated and worked at some future time.

In Figs. 7 to 12, inclusive, are illustrated sectional molds of different cross-sections, for treating different shaped ingots or billets, etc. The operation of coating the ingot is the same as described for Fig. 4. The mold in Fig. 4 is shown tapering, at 12, exaggerated for purposes of illustration, in order to facilitate the removal of the coated ingot. The mold 13 in Fig. 7, while shown slightly tapering, at 14, may, if desired, be of uniform bore, since the molds may be unbolted and removed from the ingot, instead of removing the latter from the top. With the sectional molds 13, the overlapping joints 15 are first coated with a paste of graphite and oil, enabling an easy separation of the sections, and preventing leakage of molten metal.

In Fig. 16 I have shown a section of a compound metal body of unlike metals produced according to my invention. The central portion 1 is steel, the outer portions 16 pure copper, and the film-coating 8 used as a linking nexus between the metals is a deoxidized alloy secured at "semi-molten" temperature. The film-coating 8 or linking nexus, as shown, is greatly exaggerated for the purpose of illustration.

While I have specified copper and steel as the metals used, the same process is applicable to coating or combining other metals one with another. No added manufactured protections or non-metallic substances of a protecting, fluxing, or solvent nature are necessary to protect the film-coating 8 in any manner, or cause the added copper to combine therewith.

The test piece shown in Fig. 15 was cut from the body illustrated in Fig. 16, parallel to the union between the copper 16 and steel 1, was also rolled parallel to the union to flatten it, then heated to red heat three times and plunged into ice water each time, and was then distorted by bending until the metals broke, the break occurring adjacent the line of union between the joined metals and in no manner indicating a rupture along the line of demarcation. This line of demarcation between the joined metals does not give any ordinary visible evidence of the previous presence of the film-coating referred to, the contacting surfaces being combined so thoroughly that the metals joined appear to be pure copper and steel.

In coating metals with other metals of unlike nature the base or core metal 1 need not necessarily be of iron or steel, as I can combine by the method herein described any metals which readily accept a film-coating of a deoxidized metal secured at "semi-molten" temperature. It is also obvious that all sides of film-coated articles need not be coated with the same metal, for as is well known a protector may be used to protect one or more sides of the film-coated article from a metal applied, the protector removed, or partly removed, and another unlike metal applied to the surface then exposed, and in coating metals by the process described, it is readily seen that with a film-coating secured in the manner stated, the metal caused to combine therewith need not be in an entire state of fusion as the contacting surface of the metals to be applied need only be brought to a temperature sufficiently high to cause combining with the deoxidized film-coating secured at semi-molten temperature.

By the term "ferrous metal" in certain of the claims herein, I designate all forms of iron or steel, which will readily accept a deoxidized film-coating at "semi-molten" temperature under the conditions named; and by the term "tin" I designate a metal such as tin, of low melting-point, that may be used for coating ferrous metals, as described herein; and by the term "metallic substance" I mean metals or alloys as described herein. I do not confine myself necessarily to pure metals, as certain modifications thereof can be used with fair results. I have also applied such metal of low melting temperature by precipitation, but as this method does not accomplish the preliminary heating necessary to prevent an undue amount of heat being abstracted from the semi-molten deoxidized metal, I prefer to use a metal of low melting-point in a molten condition. By the clause "added manufactured protecting apparatuses and influences," I mean to designate the protectors generally considered necessary in this art to protect a film coating of metals having a melting-point above 900° F. from detrimental atmospheric affection, also the added applied non-metallic constituents used to protect film-coatings or cause other metals to combine therewith.

I claim:—

1. A compound metal body, comprising a plurality of layers of metallic substances united on their contacting surfaces by a deoxidizing metallic substance.

2. A compound metal body, comprising a base metal, a deoxidizing metallic coating thereon, and another metallic substance united to said base metal by said coating.

3. A compound metal body, comprising a base metal, a coating of a low-melting-point metal thereon, a second coating of a deoxidizing metallic substance, and another metal united to said deoxidizing metallic substance.

4. A compound metal body, comprising a ferrous base metal, a coating of a low-melting-point metal thereon, a second coating containing a deoxidizing metal and an alloying metal, and a layer of said alloying metal upon said second coating.

5. A compound metal body, comprising a ferrous base metal, a coating of tin thereon, a coating of an alloy containing a deoxidizing metal and copper upon the tin, and a layer of copper upon said alloy.

6. A compound metal body, comprising a ferrous base metal, a coating of tin thereon, a coating of aluminum bronze upon the tin, and a layer of copper upon the aluminum bronze.

In testimony whereof I affix my signature in presence of two witnesses.

OTTO H. de LAPOTTERIE.

Witnesses:
E. F. Paton,
H. S. Hamtorne.